(12) United States Patent
Kashima et al.

(10) Patent No.: US 10,146,233 B2
(45) Date of Patent: Dec. 4, 2018

(54) FLOW RATE RATIO CONTROL APPARATUS AND PROGRAM FOR FLOW RATE RATIO CONTROL APPARATUS

(71) Applicant: HORIBA STEC, Co., Ltd., Kyoto-shi, Kyoto (JP)

(72) Inventors: Toshihiro Kashima, Kyoto (JP); Kohei Honda, Kyoto (JP); Tatsuya Hayashi, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 15/091,442

(22) Filed: Apr. 5, 2016

(65) Prior Publication Data

US 2016/0291610 A1 Oct. 6, 2016

(30) Foreign Application Priority Data

Apr. 6, 2015 (JP) ................................. 2015-078060

(51) Int. Cl.
G05D 11/13 (2006.01)

(52) U.S. Cl.
CPC ....... G05D 11/132 (2013.01); *Y10T 137/2499* (2015.04)

(58) Field of Classification Search
CPC ......... Y10T 137/2499; Y10T 137/7761; Y10T 137/2572; G05D 11/132; C23C 16/45512
See application file for complete search history.

(56) References Cited

U.S. PATENT DOCUMENTS

| | | | | |
|---|---|---|---|---|
| 4,262,686 A | * | 4/1981 | Heim | A61M 16/12 137/101.19 |
| 4,341,327 A | * | 7/1982 | Zeitz | B67D 7/08 222/135 |
| 4,938,789 A | * | 7/1990 | Tsuchiya | C03B 37/01413 118/692 |
| 5,455,076 A | * | 10/1995 | Lee | B01F 3/088 137/10 |
| 5,950,668 A | * | 9/1999 | Baumann | F15B 9/09 137/486 |
| 6,752,166 B2 | * | 6/2004 | Lull | G05D 7/0664 118/715 |

(Continued)

FOREIGN PATENT DOCUMENTS

JP 2007175691 A 7/2007

*Primary Examiner* — Kevin Murphy
(74) *Attorney, Agent, or Firm* — Alleman Hall Creasman & Tuttle LLP

(57) ABSTRACT

Provided is a flow rate ratio control device that even in change periods during which the actual flow rates of component gases change along with a change in the target total flow rate or target mixing ratio of mixed gas, can keep the actual total flow rate or actual mixing ratio of the mixed gas constant. Target flow rates set in flow rate control devices have continuous change periods during which target flow rate values continuously change from pre-change to post-change target flow rate values, respectively and correspondingly; and the time lengths of the continuous change periods are set to at least a followable time during which a flow rate control device of which a response speed to an actual component fluid flow rate is lowest allows the actual component fluid flow rate to substantially follow the target flow rate in the continuous change periods.

5 Claims, 6 Drawing Sheets

(56) References Cited

U.S. PATENT DOCUMENTS

| | | | |
|---|---|---|---|
| 7,594,517 B2 * | 9/2009 | Kannan | G05D 7/0652 137/487.5 |
| 8,496,022 B2 * | 7/2013 | Sugiyama | G05D 7/0664 137/100 |

* cited by examiner

FLOW RATE RATIO CONTROL APPARATUS AND PROGRAM FOR FLOW RATE RATIO CONTROL APPARATUS

TECHNICAL FIELD

The present invention relates to a flow rate ratio control apparatus adapted to separately control the flow rates of multiple component fluids, and control the total flow rate of mixed fluid where the multiple component fluids are mixed or the mixing ratio between or among the component fluids in the mixed fluid.

BACKGROUND ART

Mixed gas containing multiple component gases to be supplied into gas equipment such as a semiconductor manufacturing apparatus chamber is required to keep the total flow rate thereof and the mixing ratio between or among the component gases at predetermined values, respectively.

In order to obtain such mixed gas, a flow rate ratio control apparatus in Patent Literature 1 separately controls the flow rates of the component gases by, in a flow path mechanism including: supply lines through which the component gases separately flow; and a mixed gas line that is connected with the downstream end parts of the supply lines with the downstream end parts merging together, providing flow rate control devices in the supply lines, respectively.

Target flow rates to be respectively set in the flow rate control devices are calculated from the values of the target total flow rate and the target mixing ratio that are kept temporally constant. For this reason, since the target flow rates of the component gases also take constant values with respect to time, the flow rate control devices always stabilizes the actual flow rates of the component gases at the target flow rates, respectively and correspondingly, and thereby the target total flow rate and target mixing ratio of the mixed gas can be achieved.

Meanwhile, in such a flow rate ratio control apparatus, it is sometimes desired to change the target total flow rate or target mixing ratio of the mixed gas from some value to another value. In such a case, the target total flow rate or target mixing ratio to be inputted to the flow rate ratio control apparatus is discontinuously changed and then inputted, and therefore the target flow rates to be set in the flow rate control device are also instantaneously changed to values corresponding to the changed target total flow rate or target mixing ratio, respectively.

However, a response speed to an actual flow rate of each component gas with respect to a target flow rate set in a flow rate control device is limited, and therefore if there is a change period during which the target flow rate changes stepwise from some target flow rate value to another target flow rate value, the actual flow rate does not follow the change in the target flow rate. Also, there are the difference in characteristics of a flowing component gas between or among the flow rate control devices, and an instrumental error depending on a flow rate control device, and therefore the deviation amount of the actual flow rate from the target flow rate in the change period may increase. Depending on a change condition of the target total flow rate or the target mixing ratio, a target flow rate of some component gas increases, whereas a target flow rate of another component gas decreases, and therefore between a rise step response and a fall step response, the large difference in characteristics easily occurs.

Accordingly, when the target total flow rate or the target mixing ratio is changed, in a predetermined time period after the time point of the change, during which the flow rates of the component gases vary, the total flow rate and mixing ratio of the mixed gas are not stable, and unless the flow rates of the component gases are stabilized respectively at constant values after some time has passed, desired mixed gas cannot be obtained.

CITATION LIST

Patent Literature

Patent Literature 1: JP-A2007-175691

SUMMARY OF INVENTION

Technical Problem

The present invention is made in consideration of the above-described problem, and provides a flow rate ratio control apparatus that even in a predetermined time period after the target total flow rate or target mixing ratio of mixed fluid has been changed, can keep the actual total flow rate or actual mixing ratio of the mixed fluid at the changed target total flow rate or target mixing ratio.

Solution to Problem

That is, the flow rate ratio control apparatus of the present invention is one that in a flow path structure including: multiple supply lines through which multiple component fluids separately flow; and a mix line connected with the downstream end parts of the multiple supply lines, through which mixed fluid where the multiple component fluids are mixed flows, separately controls the flow rates of the component fluids respectively flowing through the supply lines such that the component fluids in the mixed fluid meet a target mixing ratio. In addition, the flow rate ratio control apparatus includes: multiple flow rate control devices that are separately provided in the supply lines and control the flow rates of the component fluids so as to achieve set target flow rates, respectively; and a target flow rate setting part that sets the target flow rates of the component fluids in the flow rate control devices, respectively and correspondingly. Further, the target flow rates set in the flow rate control devices have continuous change periods during which target flow rate values continuously change from pre-change target flow rate values to post-change target flow rate values, respectively and correspondingly, and the time lengths of the continuous change periods are set to at least a followable time during which among the flow rate control devices, a flow rate control device of which a response speed to an actual component fluid flow rate with respect to a corresponding target flow rate is lowest allows the actual component fluid flow rate to substantially follow the target flow rate in the continuous change periods.

Note that "allows the actual component fluid flow rate to substantially follow the target flow rate" means that errors occur between the target flow rates of the component fluids and corresponding ones of the actual flow rates only to the extent of giving rise to only an error enough to be allowable in the actual total flow rate or actual mixing ratio of the mixed fluid.

In such a flow rate ratio control apparatus, since the time lengths of the continuous change periods are set on the basis of the flow rate control device having the lowest response speed among the flow rate control devices provided in the respectively supply lines such that the actual component fluid flow rate can follow the target flow rate, all the flow rate control devices allow the actual component fluid flow rates to follow the target flow rates in the continuous change periods, respectively and correspondingly.

Accordingly, even in the case where the target total flow rate or target mixing ratio of the mixed fluid is changed, without making a stepwise abrupt change to any of the target flow rates of the component fluids, the target flow rates in the continuous change periods can be set such that the respective flow rate control devices can easily achieve flow rate control, and even in the continuous change periods, the actual total flow rate or actual mixing ratio of the mixed fluid can be kept at a value close to the target total flow rate or the target mixing ratio.

In order to almost simultaneously stabilize the component fluids at the post-change target flow rate values correspondingly, and make it possible to always keep the actual total flow rate or actual mixing ratio of the mixed fluid constant at the target total flow rate or the target mixing ratio, it is only necessary that the start points and end points of the continuous change periods of the target flow rates are set to substantially the same times, respectively, and the time lengths of the continuous change periods are at least the followable time and set to substantially the same length.

Note that "the start points and end points of the continuous change periods of the target flow rates are set to substantially the same times, respectively", or "the time lengths of the continuous change periods are set to substantially the same length" means that the start points are made difference only to the extent of giving rise to only an error enough to be allowable in the actual total flow rate or actual mixing ratio of the mixed fluid, and the same holds true for the end points, and the time lengths between the start points and corresponding ones of the end points.

In order to make it possible to use a simple operation to set the target flow rates of the component fluids correspondingly in the continuous change periods so as to be able to keep the actual target total flow rate or actual mixing ratio of the mixed fluid constant, and facilitate assembling even while the flow rates of the component fluids change, respectively, it is only necessary that the target flow rate setting part is one that is configured to, on the basis of a received target total flow rate of the mixed fluid and a received target mixing ratio between or among the component fluids in the mixed fluid, set the target flow rates of the component fluids in the flow rate control devices, respectively, and includes: a followable time storage part that stores the followable time of the flow rate control device having the lowest response speed; and a target flow rate function setting part that on the basis of the followable time, and target total flow rate values before and after change or target mixing ratio values before and after the change, sets the target flow rates in the continuous change periods as ramp functions.

Specific setting configurations allowing the actual flow rates of the component fluids to correspondingly follow the target flow rates in the continuous change periods include a configuration in which the target flow rate setting part is configured to set time change rates of the target flow rates in the continuous change periods to be smaller than a time change rate at which the flow rate control device having the lowest response speed allows the actual component fluid flow rate to follow the target flow rate substantially without error.

In order to make it possible to enjoy the effect of the present invention in an existing flow rate ratio control apparatus by simply changing a program, it is only necessary to use a program for a flow rate ratio control apparatus, which is a program used for a flow rate ratio control apparatus that in a flow path structure including: multiple supply lines through which multiple component fluids separately flow; and a mix line connected with the downstream end parts of the multiple supply lines, through which mixed fluid where the multiple component fluids are mixed flows, separately controls flow rates of the component fluids flowing through the supply lines such that the component fluids in the mixed fluid meet a target mixing ratio, and includes multiple flow rate control devices that are separately provided in the supply lines and control the flow rates of the component fluid so as to achieve set target flow rates. Also, the program instructs a computer to fulfill a function as a target flow rate setting part that sets the target flow rates of the component fluids in the flow rate control devices, respectively and correspondingly. In addition, the target flow rates set in the flow rate control devices have continuous change periods during which target flow rate values continuously change from pre-change target flow rate values to post-change target flow rate values, respectively and correspondingly, and the time lengths of the continuous change periods are set to at least a followable time during which among the flow rate control devices, a flow rate control device of which a response speed to an actual component fluid flow rate with respect to a corresponding target flow rate is lowest allows the actual component fluid flow rate to follow the target flow rate substantially without error in the continuous change periods. The program may be one that is electronically delivered, or stored in a storage media such as a CD, DVD, HDD, or flash memory.

Advantageous Effects of Invention

As described, according to the present invention, since the changes in the target flow rates in the continuous change periods are set on the basis of the flow rate control device having the lowest response speed, the actual flow rates of all the component fluids can be made to follow the changes in the target flow rates respectively and correspondingly to prevent difference in response speed from appearing, and even in the continuous change periods during which the target flow rates change, the actual total flow rate or actual mixing ratio of the mixed gas can be kept constant as targeted.

DESCRIPTION OF EMBODIMENTS

A flow rate ratio control apparatus 100 according to one embodiment of the present invention will be described with reference to drawings.

Figure 1:
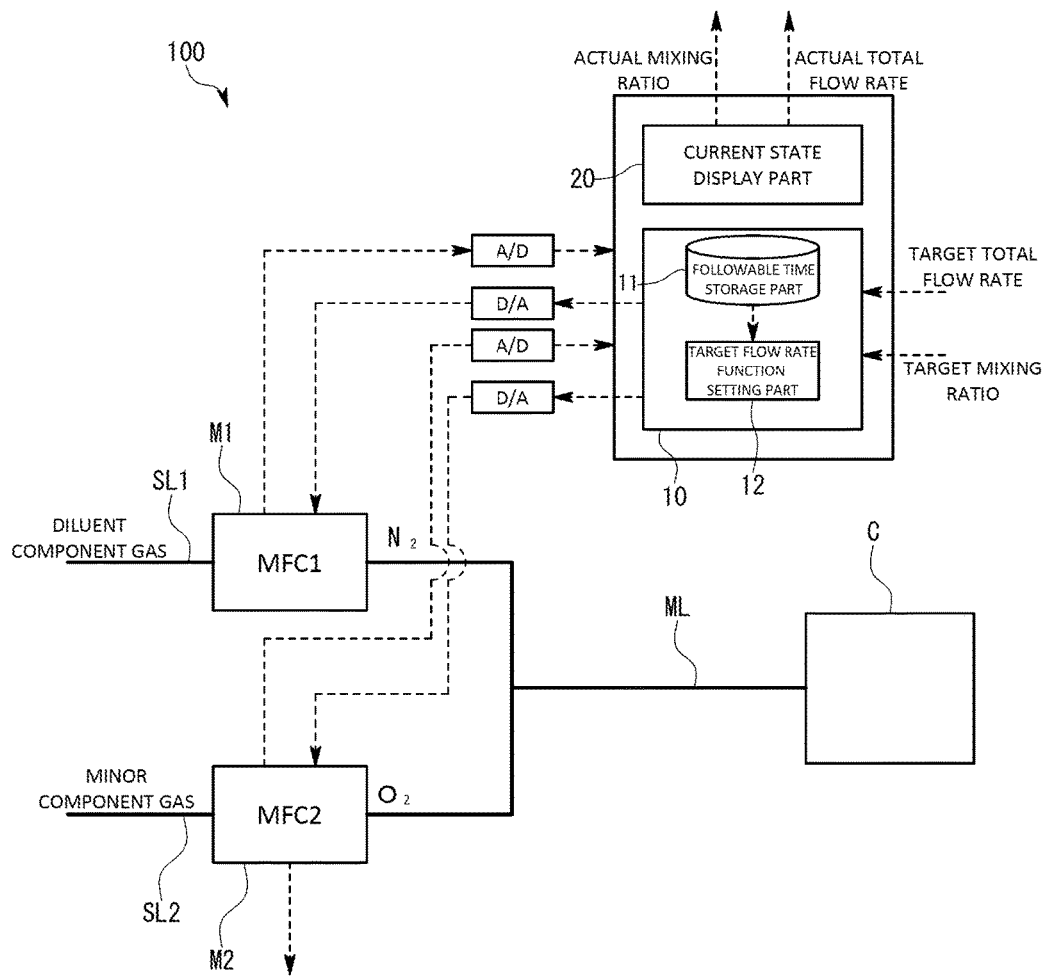
FIG. 1 is a schematic diagram illustrating a flow rate ratio control apparatus according to one embodiment of the present invention.

As illustrated in FIG. 1, the flow rate ratio control apparatus 100 is one used to supply mixed gas (mixed fluid) containing multiple component gases (component fluids) into a chamber C of a semiconductor manufacturing apparatus while keeping a predetermined target total flow rate and target mixing ratio.

More specifically, the flow rate ratio control apparatus 100 of the present embodiment is used in a flow path mechanism including supply lines SL1 and SL2 through which the component gases separately flow, and a mix line ML connected with the downstream end parts of the supply lines SL1 and SL2 with the downstream end parts merging together. The flow rate ratio control apparatus 100 uses flow rate control devices respectively provided in the supply lines SL1 and SL2 to separately control the flow rates of the component gases so as to simultaneously meet the target total flow rate of the mixed gas and the target mixing ratio between the component gases constituting the mixed gas.

In the present embodiment, the mixed gas is one in which nitrogen gas and oxygen gas are mixed, and the nitrogen gas and the oxygen gas are used as diluent component gas and minor component gas, respectively. Since the mixed gas consists of the two types of gases, in the present embodiment, as the supply lines, only the two lines SL1 and SL2 are provided, and the downstream end parts of the supply lines SL1 and SL2 are together merged with the mix line ML through which the respective gases flow mixed as the mixed gas. In the following, the supply line SL through which nitrogen flows and the supply line SL through which oxygen flows will be respectively referred to as a first supply line SL1 and a second supply line SL2 to give a description.

Next, the details of the respective parts of the flow rate ratio control apparatus 100 will be described.

The flow rate ratio control apparatus 100 is one including: a first mass flow controller M1 as the flow rate control device adapted to control the flow rate of the component gas flowing through the first supply line SL1; a second mass flow controller M2 as the flow rate control device adapted to control the flow rate of the component gas flowing through the second supply line SL2; a target flow rate setting part 10 adapted to set the target flow rates of the component gases correspondingly in the first mass flow controller M1 and the second mass flow controller M2 in accordance with the target total flow rate and target mixing ratio of the mixed gas; and a current state display part 20 adapted to display the actual total flow rate and actual mixing ratio of the mixed gas on the basis of the flow rates of the component gases actually measured by the first mass flow controller M1 and the second mass flow controller M2, respectively.

The first mass flow controller M1 and the second mass flow controller M2 are ones that basically have the same configuration, each of which includes a flow rate sensor (not illustrated), a valve (not illustrated), and a valve control part (not illustrated) of which a function is achieved by a computer, and the valve control part is configured to feedback control an opening level of the valve so as to minimize the deviation between a set target flow rate and a measured flow rate measured by the flow rate sensor. Each of the mass flow controllers M1 and M2 in the present embodiment is a so-called analog mass flow controller, and the input of a target flow rate, the output of a measured flow rate obtained by a flow rate sensor, and the like are given using an analog voltage of 0 to 5 V.

The target flow rate setting part 10 and the current state display part 20 are ones of which functions are respectively achieved in such a way that a computer different from the computers inside the mass flow controllers M1 and M2 executes a program for the flow rate ratio control apparatus 100 stored in a memory, and thereby input/output means including a CPU, memory, A/D and D/A converters, and the like collaborate. In the following, the details of the target flow rate setting part 10 will be described.

More specifically, the target flow rate setting part 10 is one that controls the mass flow controllers M1 and M2 by inputting analog voltages corresponding to the target flow rates of the component gases appropriate for the target total flow rate and target mixing ratio of the mixed gas to the mass flow controllers M1 and M2 to appropriately make settings, respectively. Note that since the target total flow rate of the mixed gas is equal to the sum of the flow rates of the component gases, and the target mixing ratio has a value obtained by dividing the flow rate of oxygen as the minor component gas by the target total flow rate, simultaneous equations using the target flow rates of the component gases to be flowed through the mass flow controllers M1 and M2 as variables can be written. The target flow rate setting part 10 solves the simultaneous equations, and thereby calculates the target flow rates of the component gases corresponding to the received target total flow rate and target mixing ratio of the mixed gas.

Further, the target flow rate setting part 10 in the present embodiment is configured to, in the case where the received target total flow rate or target mixing ratio of the mixed gas changes stepwise, set a continuous change period CP so as to prevent a substantially discontinuous change from occurring in each of the target flow rates respectively set in the mass flow controllers M1 and M2.

Figure 2A:
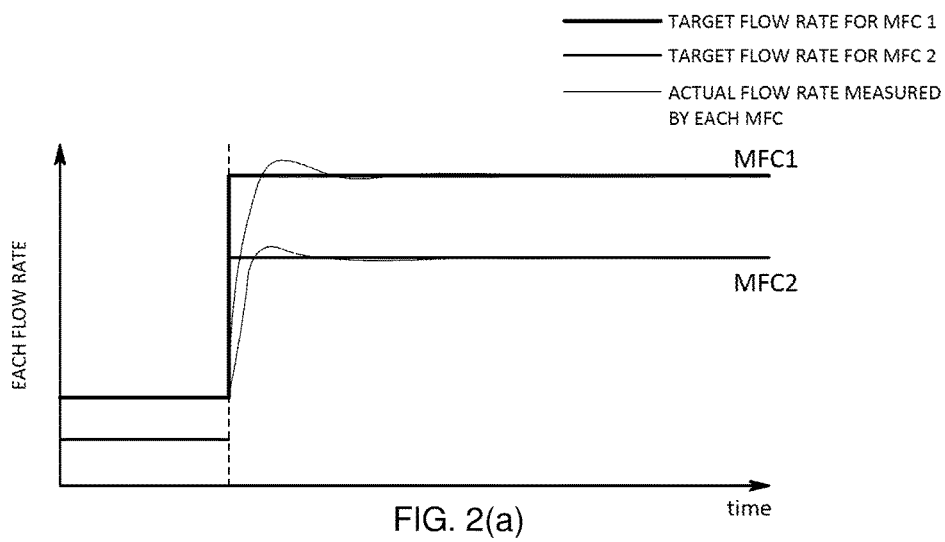
FIGS. 2(a) and 2(b) are schematic graphs illustrating the characteristics of target flow rates set by a target flow rate setting part in the same embodiment.

Now, the features of the target flow rate setting part 10 in the present embodiment will be described while making a comparison with a conventional one. In the past, in the case where a target total flow rate or a target mixing ratio changes stepwise, target flow rates respectively set in mass flow controllers have been ones obtained by directly simply converting a received target total flow rate and target mixing ratio using simultaneous equations. For this reason, as illustrated in FIG. 2A, the target flow rates to be set in the mass controllers have also been set in the mass flow controllers as instructions causing stepwise changes in the same manner as that of the target total flow rate or the target mixing ratio. Accordingly, as indicated by thin lines in FIG. 2A, the actual flow rates of component gases have given rise to delays and overshoots corresponding to the response speeds of the mass flow controllers M1, M2 to cause variation periods during which the actual flow rates of the component gases do not follow the changes in the target flow rates, respectively. In the variation periods, since the actual flow rates of the component gases respectively take values different from those of the target flow rates, any or both of the target total flow rate and the target mixing ratio are not achieved, and the mixed gas produced in the variation periods may give rise to a problem during semiconductor manufacturing.

Figure 2B:
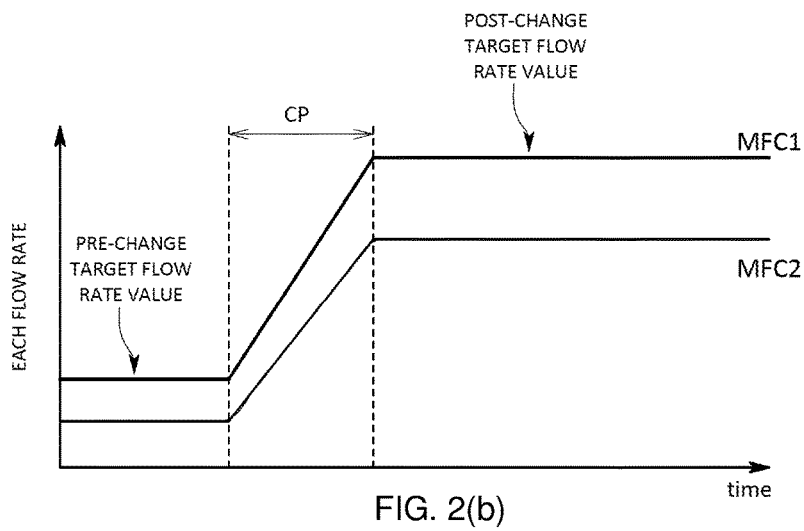

On the other hand, the target flow rate setting part 10 in the present embodiment is configured to, in the case where the target total flow rate or target mixing ratio of the mixed gas changes stepwise, as illustrated in FIG. 2B, for the target flow rates, insert the continuous change periods CPs that are predetermined time periods after time when the target total flow rate or the target mixing ratio starts to change stepwise, during which target flow rate values continuously change from pre-change target flow rate values to post-change target flow rate values. Note that if there are no continuous change periods CPs, between the pre-change target flow rate values and corresponding ones of the post-change target flow rate values, there are differences enough to change stepwise. Further, if step functions including only the pre-change target flow rate values and the post-change target flow rate values are set in the mass flow controllers M1 and M2 as the target flow rates, time delays and overshoots exist in the actual flow rates achieved by the mass flow controllers M1 and M2, and a step enough to prevent the actual total flow rate or actual mixing ratio of the mixed gas from being kept constant as targeted appears.

Still further, the target flow rate setting part 10 sets the changes in the target flow rate values in the continuous change periods CPs of the target flow rates of the component gases such that the actual flow rate values of the component gases follow the changes in the target flow rate values substantially without error on the basis of the response speeds of the mass flow controllers M1 and M2 as illustrated in FIG. 2B, respectively. More specifically, the time lengths of the continuous change periods CPs are set to at least a followable time during which between the mass flow controllers M1 and M2, a mass flow controller of which a response speed to an actual flow rate of component gas with respect to a target flow rate is lower allows the actual flow rate of the component gas substantially follow the target flow rate in a corresponding change period CP. Also, in the present embodiment, the lengths of the continuous change periods CPs are always made constant at a certain time length equal to or more than the followable time regardless of any of target flow rate step sizes. In other words, for a mass flow controller having a higher response speed, in a corresponding continuous change period CP, a target flow rate is set with the time change rate of the target flow rate having a large control margin. As described, in the continuous change periods CPs, both of the mass flow controllers M1 and M2 allow the actual flow rates of the component gases to follow the target flow rates substantially without error, respectively and correspondingly.

In order to achieve the above-described function, the target flow rate setting part 10 includes: a followable time storage part 11 adapted to store the followable time of the mass flow controller having a lower response speed; and a target flow rate function setting part 12 adapted to, on the basis of the followable time and pre-change and post change target total flow rate values or pre-change and post change target mixing ratio values, set the target flow rates in the continuous change periods CPs as ramp functions.

The followable time storage part 11 stores the followable time that is determined on the basis of the change amount of the target flow rate value allowing the actual flow rate to follow the target flow rate without error, for example, with reference to the largest one among possible step change amounts of the target total flow rate or target mixing ratio of the mixed gas. For example, the followable time storage part 11 may be configured to store the followable time for each target flow rate step size in order to minimize a time to reach the post-change target flow rate value from the pre-change target flow rate value, i.e., the time length of the continuous change period CP to achieve high speed flow rate control, and at the same time keep the target total flow rate and the target mixing ratio.

For the continuous change periods CPs, the target flow rate function setting part 12 sets target flow rate functions that change in a ramp manner over a time length equal to or more than the followable time with the pre-change target flow rate values calculated from the values of the received target total flow rate or target mixing ratio of the mixed gas before and after the step and the post-change target flow rate values different from the pre-change target flow rate values by predetermined values or more as start points and end points, respectively. For periods other than the continuous change periods CPs, the target flow rate function setting part 12 sets functions so as to keep constant target flow rate values. Note that whether or not to insert the ramp functions may be determined on the basis of whether or not at least one of the absolute values of the differences between the pre-change target flow rate values and corresponding ones of the post-change target flow rate values is equal to or more than a predetermined value or more and therefore at least one of the differences cannot be substantially handled as continuity.

As described, in the flow rate ratio control apparatus 100 of the present embodiment, since the lengths of the continuous change periods CPs and the target flow rate functions are determined on the basis of the mass flow controller having a lower response speed, all the mass flow controllers M1 and M2 allow the actual flow rates of the component gases to follow the target flow rates substantially without error in the continuous change periods CPs, respectively and correspondingly.

Next, the effect obtained in the case where the actual flow rates of the component gases change in substantially the same manner as that of the target flow rates in the continuous change periods CPs respectively and correspondingly will be described with reference to graphs in FIGS. 3 and 4.

Figure 3:
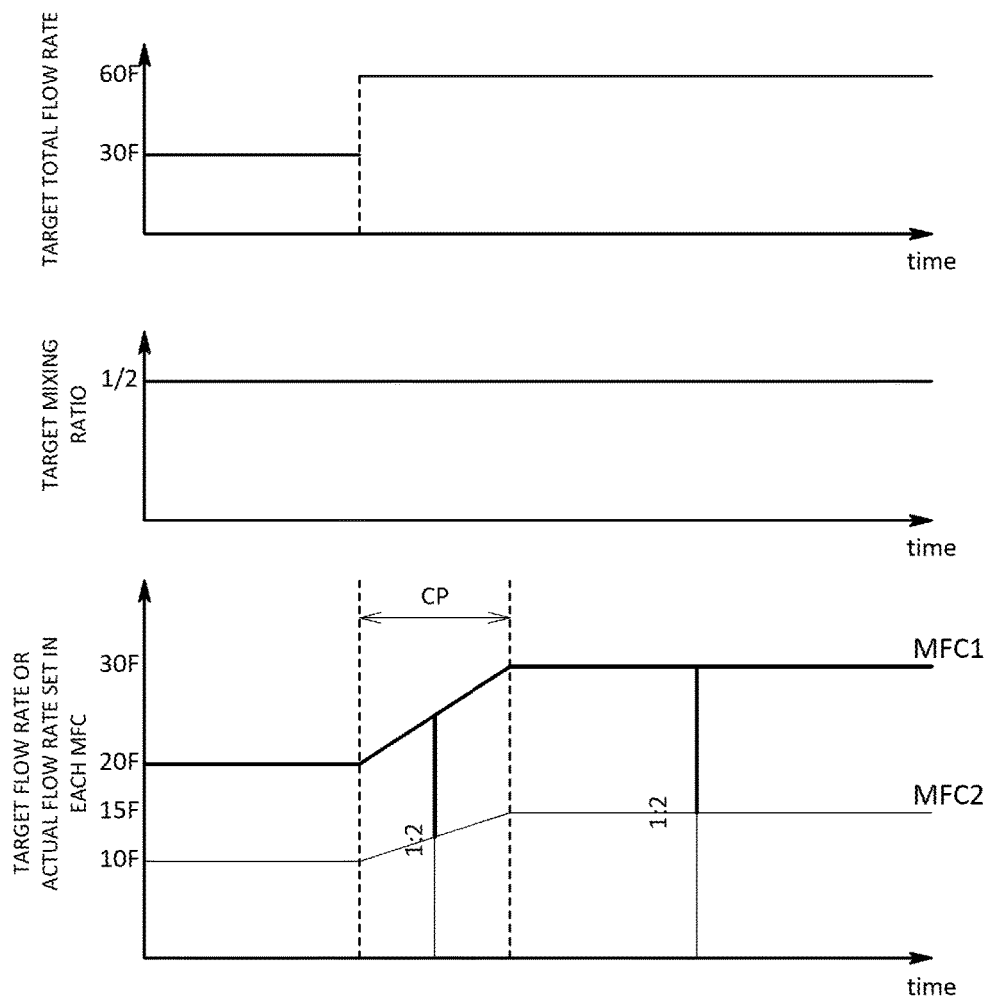
FIG. 3 is a schematic graph illustrating the target flow rates of component gases set when changing a target total flow rate while keeping a target mixing ratio constant in the same embodiment.

FIG. 3 is a time series graph illustrating changes in the target flow rates and actual flow rates of the component gases in the case where the target total flow rate of the mixed gas is changed stepwise with the target mixing ratio kept constant.

In FIG. 3, the target flow rate setting part 10 sets the continuous change periods CPs for a period from a time point when the total flow rate of the mixed gas is set to be twice to a time point after the elapse of a predetermined time. It is configured to keep the ratio between the pre-change target flow rate values of the component gases and that between the post-change target flow rate values at 1:2. Further, in the continuous change periods CPs, the pre-change target flow rate values and corresponding ones of the post-change target flow rate values are connected by ramp functions (linear functions), and therefore the above flow rate ratio between the component gases is preserved. Also, in the continuous change periods CPs, the actual flow rates of the component gases follow the changes in the target flow rates with sufficient accuracy, respectively and correspondingly, and even during a period when the actual total flow rate of the mixed gas changes, the actual mixing ratio of the mixed gas can be kept constant at substantially 1/2.

Figure 4:
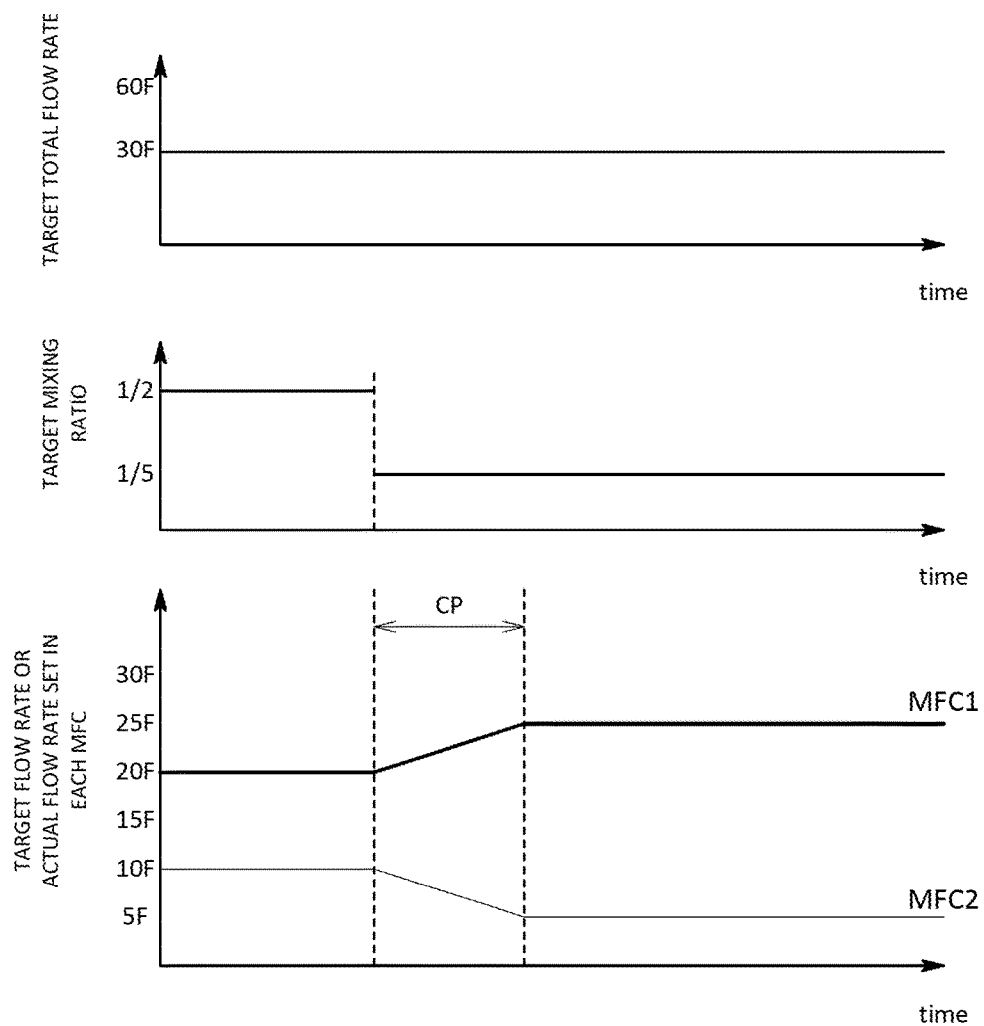
FIG. 4 is a schematic graph illustrating the target flow rates of the component gases set when changing the target mixing ratio while keeping the target total flow rate constant in the same embodiment.

On the other hand, FIG. 4 is a time series graph illustrating changes in the target flow rates and actual flow rates of the component gases in the case where the target mixing ratio of the mixed gas is changed stepwise with the target total flow rate kept constant. As in FIG. 3, since it is configured that the actual flow rates of all the gases follow the target flow rates changing in a ramp manner in the continuous change periods CPs, respectively and correspondingly, even in the case where the actual mixing ratio of the mixed gas changes, the actual total flow rate of the mixed gas can be kept at a constant value. In particular, in the case of FIG. 4, since an increase/decrease direction is opposite between the component gases, difference is likely to appear in flow rate control characteristics, and during variations in actual flow rates, in the past, the actual total flow rate of mixed gas has not been stabilized at a constant value, whereas the flow rate ratio control apparatus 100 of the present embodiment can always keep the actual total flow rate of the mixed gas substantially constant.

Figure 5:
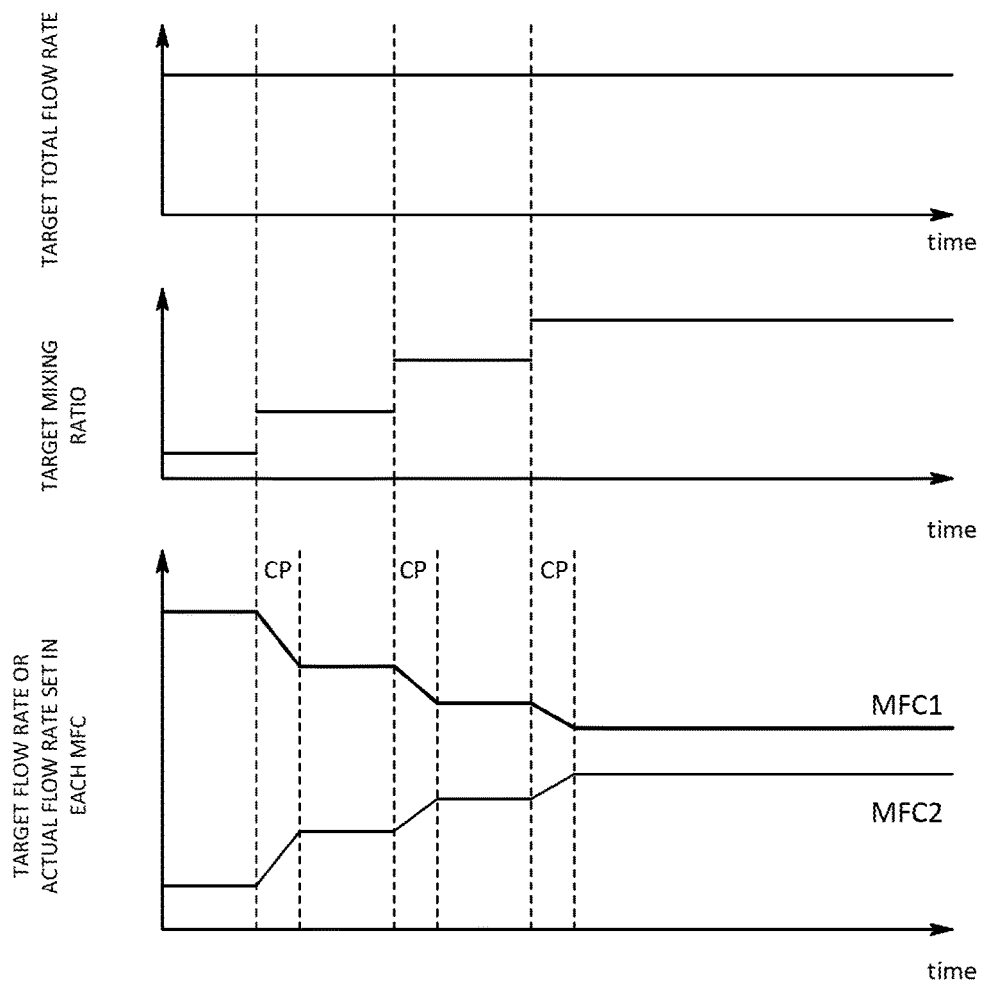
FIG. 5 is a schematic graph illustrating the relationship among multiple continuous change periods in the same embodiment.

A variation of the present embodiment will be described. As illustrated in FIG. 5, in the case where during the control action of the flow rate ratio control apparatus 100, multiple stepwise changes are made to the target total flow rate or the target mixing ratio, it is only necessary to always set the lengths of continuous change periods CPs to be set for the respective stepwise changes to the same length equal to or more than the followable time. For example, by setting the lengths of the continuous change periods CPs to be equal or more than the followable time on the basis of the largest one among the most possible step size values between before and after the changes of the target total flow rate or the target mixing ratio, regardless of how the target total flow rate or the target mixing ratio changes, the actual flow rates of the component gases can be made to always follow the target flow rates, respectively and correspondingly. It is only necessary to set such time lengths of the continuous change periods CP within a range where a control problem does not occur after experimentally obtaining the limit values of the mass flow controllers adapted to control the flow rates of the component gases, respectively and correspondingly.

Other embodiments will be described.

Figure 6:
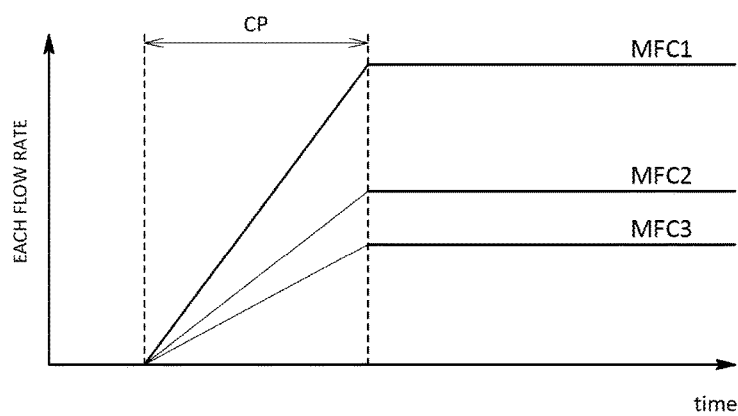
FIG. 6 is a schematic graph illustrating an example of the target flow rate values of component gases in another embodiment of the present invention.

In the above-described embodiment, the component gases are of the two types, and the number of the supply lines is also only two; however, the present invention can also be applied to the case of mixing three or more types of component gases to produce mixed gas. For example, as illustrated in FIG. 6, setting the lengths of continuous change periods with reference to a mass flow controller having the lowest response speed, and connecting between pre-change target flow rate values and corresponding post-change target flow rate values by ramp functions makes it possible to obtain the same effect as that of the above-described embodiment.

Further, in the above-described embodiment, the changes in the target flow rates in the continuous change periods are represented by the ramp functions, respectively; however, the present invention may be adapted to use another interpolation method such as S-shaped acceleration/deceleration to continuously cause changes in the target flow rates in the continuous change periods. In short, it is only necessary to make settings with reference to a mass flow controller having the lowest response speed such that the actual flow rates of component gases follow target flow rates in continuous change periods without error, respectively and correspondingly.

Also, the followable time may be stored in the followable time storage part so as to increase as the change amount of a target flow rate increases.

Further, the target flow rate setting part may be configured to set the time change rates of the target flow rates in the continuous change periods to be smaller than the time change rate at which the flow rate control device having the lowest response speed allows the actual flow rate of the component fluid to follow the target flow rate substantially without error. Still further, it is only necessary to set the start points and end points of the continuous change periods within a predetermined period after the reference time point when the target total flow rate or the target mixing ratio changes. In these cases as described, the lengths of the continuous change periods of the target flow rates respectively set in the flow rate control devices are not required to be constant. Even in such a configuration, in at least an overlap period between the continuous change periods, the actual total flow rate or actual mixing ratio of the mixed gas can be stabilized at a value closer to a target than before.

The target flow rate setting part is not limited to one adapted to calculate the target flow rates by itself on the basis of the received target total flow rate and target mixing ratio of the mixed gas, but may be one adapted to, for example, receive target flow rates themselves calculated so as to achieve a target total flow rate and a target mixing ratio. For example, it is only necessary that in the case where the target flow rates include stepwise change parts, the target flow rate setting part inserts continuous change periods in place of the discontinuous parts as described in the above embodiment, and sets the lengths of the continuous change periods on the basis of a flow rate control device having the lowest response speed.

In addition, in the above-described embodiment, the present invention is used to mix the gases, but may be used to mix liquids. Also, each flow rate control device is not only a packaged mass flow controller, but may also be configured by separately preparing a valve, a flow rate sensor, and a controller.

In the above-described embodiment, each component gas is configured to contain one type of component. However, for example, it may be configured to produce gas as component gas by mixing multiple types of gases in predetermined concentrations in advance, and mix component gases like this respectively containing multiple types of elements as mixed gas.

In the above-described embodiment, the target flow rate setting part is configured to set the continuous change periods having the same start and end points in the flow rate control devices, respectively. However, each of a start point and an end point may be slightly different between or among the flow rate control devices. For example, in the case where a predetermined tolerance is set for the target total flow rate or the target mixing ratio, each of a start point and an end point of a continuous change period set for a target flow rate may be made difference between or among the flow rate control devices within a range making it possible to meet the tolerance. Also, the lengths of the continuous change periods set for the target flow rates for the flow rate control devices respectively may also be slightly different.

The respective flow rate control devices constituting the flow rate ratio control apparatus may be of the same type, or flow rate control devices of different types may be used together. In either case, it is only necessary to set the lengths of continuous change periods on the basis of a flow rate control device having the lowest response speed to an actual flow rate through, for example, experiment or the like in advance. Also, the flow rate ratio control apparatus of the present invention is not only used for a semiconductor control apparatus, but may be used for other applications. For example, the flow rate ratio control apparatus of the present invention may be used to, for example, adjust span gas or the like that contains multiple components and is used to calibrate a measurement instrument.

The above-described embodiment can be used for gas, liquid or slurry. Thus, the fluid includes not only the gas but also the liquid or the slurry.

Besides, various modifications and combinations of the embodiments can be made without departing from the scope of the present invention.

REFERENCE SIGNS LIST

100: Flow rate ratio control apparatus
SL: Supply line
ML: Mix line
C: Chamber
M: Mass flow controller (flow rate control device)
10: Target flow rate setting part
11: Followable time storage part
12: Target flow rate function setting part

The invention claimed is:

1. A flow rate ratio control apparatus in a flow path structure, the flow path structure including:
multiple supply lines through which multiple component fluids separately flow; and
a mix line connected with downstream end parts of the multiple supply lines, the mix line being a line through which mixed fluid where the multiple component fluids are mixed flows,
the flow rate ratio control apparatus configured to separately control flow rates of the component fluids respectively flowing through the supply lines such that the component fluids in the mixed fluid meet a target mixing ratio,
the flow rate ratio control apparatus comprising:
multiple flow rate control devices including at least a first mass flow controller to control a first flow rate of a first component gas and a second mass flow controller to control a second flow rate of a second component gas, the multiple component fluids including at least the first component gas and the second component gas, the first mass flow controller and the second mass flow controller separately provided in the supply lines so as to achieve set target flow rates, respectively; and
a target flow rate setting part that sets the target flow rates of the component fluids in the first mass flow controller and the second mass flow controller, respectively and correspondingly, wherein:
the second mass flow controller has a lower response speed compared to the first mass flow controller and the target flow rate setting part sets the target flow rate according to the second mass flow controller having the lower response speed;
the target flow rate setting part sets the target flow rates to have continuous change periods during which target flow rate values continuously change from pre-change target flow rate values to post-change target flow rate values, respectively and correspondingly;
the target flow rate setting part sets time lengths of the continuous change periods so that each of the flow rate control devices substantially matches each actual component fluid flow rate to each of the target flow rate in the continuous change periods, respectively and correspondingly;
the target flow rate setting part sets target flow rate values at start points of the continuous change periods to have a same rate of change as respective target flow rate values at end points of the continuous change periods;
the target flow rate setting part calculates linear functions passing through each respective pair of start points and end points;
the target flow rate setting part sets values of the target flow rates during the continuous change periods based on the linear functions so that the flow rate values set in the flow rate control devices are maintained at a same ratio during an overlapping period of the continuous change periods; and
the flow rate ratio control apparatus is configured to maintain an actual mixing ratio during the continuous change periods at the target mixing ratio.

2. The flow rate ratio control apparatus according to claim 1, wherein
start points and end points of the continuous change periods of the target flow rates are set to substantially same times, respectively, and the time lengths of the continuous change periods are set to substantially a same length.

3. The flow rate ratio control apparatus according to claim 1, wherein
the target flow rate setting part is configured to, on a basis of a received target total flow rate of the mixed fluid and a received target mixing ratio between or among the component fluids in the mixed fluid, set the target flow rates of the component fluids in the flow rate control devices, respectively and correspondingly, and
the target flow rate setting part comprises a target flow rate function setting part that, on a basis of target total flow rate values before and after change or target mixing ratio values before and after the change, sets the target flow rates in the continuous change periods as ramp functions.

4. The flow rate ratio control apparatus according to claim 1, configured to set time change rates of the target flow rates in the continuous change periods to be smaller than a time change rate at which a flow rate control device having a lowest response speed allows the actual component fluid flow rate to follow the target flow rate substantially without error.

5. A non-volatile storage medium that stores a program for a flow rate ratio control apparatus, the program being used for the flow rate ratio control apparatus in a flow path structure, the flow path structure including:
multiple supply lines through which multiple component fluids separately flow; and
a mix line connected with downstream end parts of the multiple supply lines, the mix line being a line through which mixed fluid where the multiple component fluids are mixed flows,
the flow rate ratio control apparatus configured to separately control flow rates of the component fluids flowing through the supply lines such that the component fluids in the mixed fluid meet a target mixing ratio, and comprising multiple flow rate control devices including at least a first mass flow controller to control a first flow rate of a first component gas and a second mass flow controller to control a second flow rate of a second component gas, the multiple component fluids including at least the first component gas and the second component gas, the first mass flow controller and the second mass flow controller separately provided in the supply lines so as to achieve set target flow rates, and
the program instructing a computer to fulfill a function as a target flow rate setting part that sets the target flow rates of the component fluids in the first mass flow controller and the second mass flow controller, respectively and correspondingly, wherein:
the second mass flow controller has a lower response speed compared to the first mass flow controller and the target flow rate setting part sets the target flow rate according to the second mass flow controller having the lower response speed;

the target flow rate setting part sets the target flow rates to have continuous change periods during which target flow rate values continuously change from pre-change target flow rate values to post-change target flow rate values, respectively and correspondingly;

the target flow rate setting part sets time lengths of the continuous change periods are so that each of the flow rate control devices substantially matches each actual component fluid flow rate to each of the target flow rates in the continuous change periods, respectively and correspondingly;

the target flow rate setting part sets target flow rate values at start points of the continuous change periods to have a same rate of change as respective target flow rate values at end points of the continuous change periods;

the target flow rate setting part calculates linear functions passing through each respective pair of start points and end points;

the target flow rate setting part sets values of the target flow rates during the continuous change periods based on the linear functions so that the flow rate values set in the flow rate control devices are maintained at a same ratio during an overlapping period of the continuous change periods; and an actual mixing ratio during the continuous change periods is maintained at the target mixing ratio.

* * * * *